United States Patent
Isoyama et al.

(10) Patent No.: US 11,189,974 B2
(45) Date of Patent: Nov. 30, 2021

(54) CONNECTOR SYSTEM, CONNECTOR, AND CONNECTION METHOD

(71) Applicants: SUMITOMO ELECTRIC INDUSTRIES, LTD., Osaka (JP); NATIONAL UNIVERSITY CORPORATION YOKOHAMA NATIONAL UNIVERSITY, Yokohama (JP)

(72) Inventors: Yoshikazu Isoyama, Osaka (JP); Yoichi Hata, Osaka (JP); Tsutomu Matsumoto, Yokohama (JP)

(73) Assignees: SUMITOMO ELECTRIC INDUSTRIES, LTD., Osaka (JP); NATIONAL UNIVERSITY CORPORATION YOKOHAMA NATIONAL UNIVERSITY, Yokohama (JP)

(*) Notice: Subject to any disclaimer, the term of this patent is extended or adjusted under 35 U.S.C. 154(b) by 0 days.

(21) Appl. No.: 16/981,962

(22) PCT Filed: Nov. 30, 2018

(86) PCT No.: PCT/JP2018/044123
§ 371 (c)(1),
(2) Date: Sep. 17, 2020

(87) PCT Pub. No.: WO2019/187349
PCT Pub. Date: Oct. 3, 2019

(65) Prior Publication Data
US 2021/0151941 A1 May 20, 2021

(30) Foreign Application Priority Data
Mar. 27, 2018 (JP) ............... JP2018-060259

(51) Int. Cl.
*H02M 1/00* (2006.01)
*H01R 13/703* (2006.01)
*B60R 16/023* (2006.01)

(52) U.S. Cl.
CPC ....... *H01R 13/7036* (2013.01); *B60R 16/023* (2013.01)

(58) Field of Classification Search
CPC .......... H01R 13/6675; G05F 3/06; H05F 3/06
(Continued)

(56) References Cited

U.S. PATENT DOCUMENTS 5,297,015 A 3/1994 Miyazaki et al.
5,474,464 A * 12/1995 Drewnicki ............. H01R 27/00
439/172

(Continued)

FOREIGN PATENT DOCUMENTS

JP H03-053475 A 3/1991
JP 2010-283902 A 12/2010
(Continued)

*Primary Examiner* — Phuong Chi Thi Nguyen
(74) *Attorney, Agent, or Firm* — Oliff PLC

(57) ABSTRACT

A connector system is provided with a first connector including a first transmission line, and a second connector including a second transmission line. The second connector includes a processing unit configured to perform an information transmission process of creating information regarding verification, and transmitting the information to the first connector. The first connector includes: a switch configured to, in a state where the first connector and the second connector are connected to each other, select whether or not to electrically connect the first transmission line and the second transmission line to each other; a verification unit configured to perform a verification process of verifying the second connector, based on the information received from the second connector; and a control unit configured to
(Continued)

control the switch, based on a result of the verification process.

13 Claims, 11 Drawing Sheets

(58) Field of Classification Search
USPC .......................... 363/146; 307/151; 315/291
See application file for complete search history.

(56) References Cited

U.S. PATENT DOCUMENTS

| | | | | |
|---|---|---|---|---|
| 5,601,453 | A | * | 2/1997 | Horchler .............. H01R 13/73 439/567 |
| 5,672,066 | A | * | 9/1997 | Yeung ................. H01R 27/02 307/147 |
| 5,821,676 | A | * | 10/1998 | Atchinson, II ........ H01T 13/39 313/140 |
| 6,328,584 | B1 | * | 12/2001 | Follett ................ H01R 27/00 439/222 |
| 2010/0301802 | A1 | | 12/2010 | Iida |
| 2012/0300860 | A1 | | 11/2012 | Washiro |
| 2013/0115821 | A1 | | 5/2013 | Golko et al. |
| 2013/0122754 | A1 | | 5/2013 | Golko et al. |
| 2013/0149911 | A1 | | 6/2013 | Golko et al. |
| 2013/0244492 | A1 | | 9/2013 | Golko et al. |
| 2014/0170907 | A1 | | 6/2014 | Golko et al. |
| 2016/0036171 | A1 | | 2/2016 | Golko et al. |
| 2016/0359279 | A1 | | 12/2016 | Golko et al. |
| 2017/0338603 | A1 | | 11/2017 | Golko et al. |
| 2018/0233861 | A1 | | 8/2018 | Golko et al. |
| 2018/0323552 | A1 | | 11/2018 | Golko et al. |

FOREIGN PATENT DOCUMENTS

| | | |
|---|---|---|
| JP | 2011-082135 A | 4/2011 |
| JP | 2017-017034 A | 1/2017 |
| WO | 2012/026353 A1 | 3/2012 |

* cited by examiner

CONNECTOR SYSTEM, CONNECTOR, AND CONNECTION METHOD

TECHNICAL FIELD

The present invention relates to a connector system, a connector, and a connection method.

This application claims priority on Japanese Patent Application No. 2018-60259 filed on Mar. 27, 2018, the entire contents of which are incorporated herein by reference.

BACKGROUND ART

As a technology regarding a connector, for example, Japanese Laid-Open Patent Publication No. 2017-17034 (Patent Literature 1) discloses a dual orientation electronic connector as follows. That is, the dual orientation electronic connector includes a connector tab having first and second opposing major surfaces, and a plurality of electrical contacts carried by the connector tab. The plurality of contacts include a set of first external contacts formed on the first major surface, and a set of second external contacts formed on the second major surface. In the tab or a body, each individual contact of the first contacts is electrically connected to a corresponding contact of the second contacts. In some embodiments, contacts, of the first and second contacts, which directly face each other are integrally combined. In some other embodiments, contacts, of the first and second contacts, which are in a diagonal relationship are integrally combined.

CITATION LIST

Patent Literature

PATENT LITERATURE 1: Japanese Laid-Open Patent Publication No. 2017-17034
PATENT LITERATURE 2: International Publication No. WO2012/026353

SUMMARY OF INVENTION (1) A connector system according to the present disclosure is provided with a first connector including a first transmission line, and a second connector including a second transmission line. The second connector includes a processing unit configured to perform an information transmission process of creating information regarding verification, and transmitting the information to the first connector. The first connector includes: a switch configured to, in a state where the first connector and the second connector are connected to each other, select whether or not to electrically connect the first transmission line and the second transmission line to each other; a verification unit configured to perform a verification process of verifying the second connector, based on the information received from the second connector; and a control unit configured to control the switch, based on a result of the verification process.

(10) A connector according to the present disclosure is a connector including a first transmission line. The connector includes: a switch configured to, in a state where the connector and another connector having a second transmission line are connected to each other, select whether or not to electrically connect the first transmission line and the second transmission line to each other; a verification unit configured to perform a verification process of verifying a mating device connected to the connector; and a control unit configured to control the switch, based on a result of the verification process.

(12) A connector according to the present disclosure is a connector connectable to a mating connector including a first transmission line. The connector includes: a processing unit configured to create information regarding verification and to transmit the information to the mating connector; and a second transmission line. The mating connector includes: a switch configured to, in a state where the mating connector is connected to another connector, select whether or not to electrically connect the first transmission line and the second transmission line to each other; a verification unit configured to perform a verification process of verifying the other connector, based on the information; and a control unit configured to control the switch, based on a result of the verification process.

(13) A connection method according to the present disclosure is a connection method adopted in a connector system which is provided with a first connector including a first transmission line and a second connector including a second transmission line. The first connector further includes a switch configured to, in a state where the first connector and the second connector are connected to each other, select whether or not to electrically connect the first transmission line and the second transmission line to each other. The method includes: a step in which the second connector performs an information transmission process of creating information regarding verification, and transmitting the information to the first connector; a step in which the first connector performs a verification process of verifying the second connector, based on the information received from the second connector; and a step in which the first connector controls the switch, based on a result of the verification process.

One aspect of the present disclosure can be realized not only as the connector system including the characteristic processing unit as described above, but also as a program for causing a computer to execute the steps described above. Furthermore one aspect of the present disclosure can be realized as a semiconductor integrated circuit realizing a part or all of the connector system.

One aspect of the present disclosure can be realized not only as the connector including the characteristic processing unit as described above, but also as a connection method including steps of characteristic processes as described above, or as a program for causing a computer to execute the steps. Furthermore, one aspect of the present disclosure can be realized as a semiconductor integrated circuit realizing a part or all of the connector.

DESCRIPTION OF EMBODIMENTS

Figure 1:
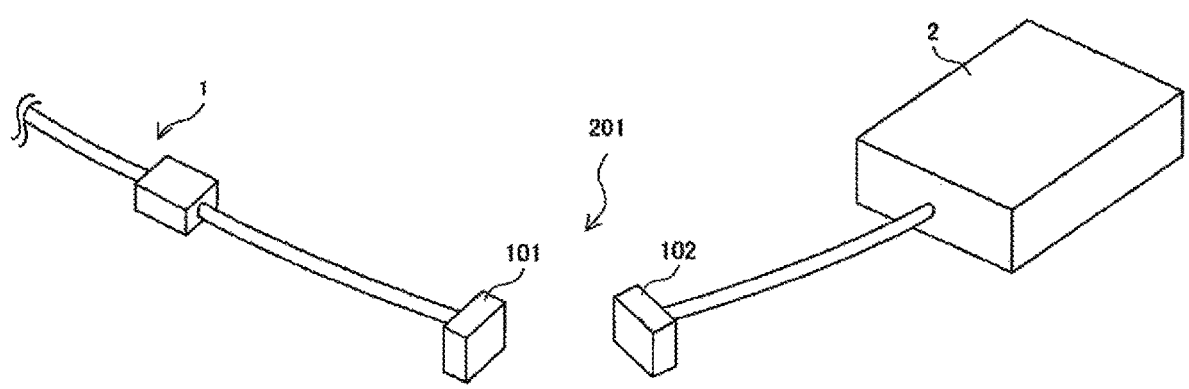
FIG. 1 shows an application example of a connector system according to a first embodiment of the present disclosure.

Problems to be Solved by the Present Disclosure

For example, when devices are connected to each other via the connector disclosed in Patent Literature 1, the devices can communicate with each other. However, it is difficult to ensure sufficient security for the communication between the devices.

The present disclosure is made to solve the above problem, and an object of the present disclosure is to provide a connector system, a connector, and a connection method which are capable of controlling electrical connection between devices more appropriately.

Effects of the Present Disclosure

According to the present disclosure, it is possible to control electrical connection between devices more appropriately.

DESCRIPTION OF EMBODIMENTS OF THE PRESENT DISCLOSURE

First, contents of the embodiments of the present disclosure will be listed for description.

(1) A connector system according to the present disclosure is provided with a first connector including a first transmission line, and a second connector including a second transmission line. The second connector includes a processing unit configured to perform an information transmission process of creating information regarding verification, and transmitting the information to the first connector. The first connector includes: a switch configured to, in a state where the first connector and the second connector are connected to each other, select whether or not to electrically connect the first transmission line and the second transmission line to each other; a verification unit configured to perform a verification process of verifying the second connector, based on the information received from the second connector; and a control unit configured to control the switch, based on a result of the verification process.

In the above configuration, the electrical connection between the first transmission line and the second transmission line is switched based on the result of the verification process performed by the first connector. Therefore, when transmission of a communication signal is performed through the first transmission line and the second transmission line, communication with an unintended device is avoided, whereby security is ensured. In addition, when transmission of power is performed through the first transmission line and the second transmission line, the power is prevented from being transmitted to an unintended device. Therefore, electrical connection between devices can be controlled more appropriately.

(2) Preferably, the first connector and the second connector respectively include additional transmission lines that are electrically connected to each other without the switch intervening therebetween, in the state where the first connector and the second connector are connected to each other.

In this configuration, since the connector system is provided with transmission lines for ensuring security and transmission lines that do not need security to be ensured, connection modes between various devices can be provided.

(3) Preferably, power regarding an operation of the first connector is supplied from the second connector.

In this configuration, even when the first connector does not include a power supply, the first connector can perform operations such as verification while being supplied with the power from the second connector.

(4) Preferably, the verification unit starts the verification process when the first connector and the second connector are connected to each other.

In this configuration, since the first connector proactively starts the verification process, the second connector is allowed to perform the information transmission process earlier.

(5) Preferably, the processing unit starts the information transmission process upon receiving a request for the information from the first connector.

In this configuration, for example, even when connection to the first connector is not detected in the second connector, the first connector can perform the verification process by causing the second connector to transmit the information regarding verification.

(6) Preferably, the verification unit performs the verification process periodically or non-periodically. After turning on the switch based on the result of the verification process, the control unit determines whether or not to turn off the switch, based on a result of a new verification process.

In this configuration, for example, after the verification process for the second connector has succeeded, disconnection of the second connector from the first connector can be detected through the new verification process. Therefore, the switch can be controlled according to a change in the connected state.

(7) Preferably, the switch is in an off state in a state where the first connector and the second connector are not connected to each other. When the verification unit has not received the information for a predetermined period or more, the verification unit notifies the control unit that the verification has failed. When the control unit is notified of the failure of verification from the verification unit, the control unit maintains the switch in the off state.

In this configuration, for example, communication between the first connector and a device, which does not transmit information regarding verification for a predetermined period or more from the timing at which the device has been connected to the first connector, can be avoided, whereby security is ensured more reliably.

For example, communication between the first connector and a device, which does not transmit information regarding new verification for a predetermined period or more from the timing at which the device has transmitted previous information regarding verification, can be avoided, whereby security is ensured more reliably.

(8) Preferably, the verification unit, in the verification process, receives the information regarding verification from the processing unit through a wire.

In this configuration, even when a plurality of connectors are present in a neighboring area, unintended connection and inhibition of correct communication can be avoided. In addition, even when multiple connectors adopting the same connection method as that adopted between the first connector and the second connector are present in the neighboring area, appropriate connection can be performed.

Even when the first connector and the second connector are provided under an environment where they are likely to be influenced by noise, the influence of noise can be reduced.

(9) Preferably, the first connector and the second connector are mounted on a vehicle.

In this configuration, even when a plurality of connectors are present in a neighboring area, the first and second connectors can be normally operated. Further, in an environment where multiple devices are present and noise is large, influence of noise can be reduced.

(10) A connector according to an embodiment of the present disclosure is a connector including a first transmission line. The connector includes: a switch configured to, in a state where the connector and another connector having a second transmission line are connected to each other, select whether or not to electrically connect the first transmission line and the second transmission line to each other; a verification unit configured to perform a verification process of verifying a mating device connected to the connector; and a control unit configured to control the switch, based on a result of the verification process.

In this configuration, the electrical connection between the first transmission line and the second transmission line is switched based on the result of the verification process performed by the first connector. Therefore, when transmission of a communication signal is performed through the first transmission line and the second transmission line, communication with an unintended device is avoided, whereby security is ensured. In addition, when transmission of power is performed through the first transmission line and the second transmission line, the power is prevented from being transmitted to an unintended device. Thus, electrical connection between devices can be controlled more appropriately.

(11) Preferably, the connector is mounted on a vehicle.

In this configuration, even when a plurality of connectors are present in a neighboring area, unintended connection and inhibition of correct communication can be avoided. In addition, even when multiple connectors adopting the same connection method as that adopted between the first connector and the second connector are present in the neighboring area, appropriate connection can be performed.

Under an environment where multiple devices are present and noise is large, electrical connection between devices can be controlled more appropriately.

(12) A connector according to an embodiment of the present disclosure is a connector connectable to a mating connector including a first transmission line. The connector includes: a processing unit configured to create information regarding verification, and to transmit the information to the mating connector; and a second transmission line. The mating connector includes: a switch configured to, in a state where the mating connector is connected to another connector, select whether or not to electrically connect the first transmission line and the second transmission line to each other; a verification unit configured to perform a verification process of verifying the other connector, based on the information; and a control unit configured to control the switch, based on a result of the verification process.

In this configuration, in the mating connector, the verification process for the other connector can be performed by using the information regarding verification transmitted from the other connector, and the electrical connection between the first transmission line and the second transmission line can be switched based on the result of the verification process. Therefore, when transmission of a communication signal is performed through the first transmission line and the second transmission line, communication with an unintended device is avoided, whereby security is ensured. In addition, when transmission of power is performed through the first transmission line and the second transmission line, the power is prevented from being transmitted to an unintended device. Thus, electrical connection between devices can be controlled more appropriately.

(13) A connection method according to an embodiment of the present disclosure is a connection method adopted in a connector system which is provided with a first connector including a first transmission line and a second connector including a second transmission line. The first connector further includes a switch configured to, in a state where the first connector and the second connector are connected to each other, select whether or not to electrically connect the first transmission line and the second transmission line to each other. The method includes: a step in which the second connector performs an information transmission process of creating information regarding verification, and transmitting the information to the first connector; a step in which the first connector performs a verification process of verifying the second connector, based on the information received from the second connector; and a step in which the first connector controls the switch, based on a result of the verification process.

In the above method, the electrical connection between the first transmission line and the second transmission line is switched based on the result of the verification process performed by the first connector. Therefore, when transmission of a communication signal is performed through the first transmission line and the second transmission line, communication with an unintended device is avoided, whereby security is ensured. In addition, when transmission of power is performed through the first transmission line and the second transmission line, the power is prevented from being transmitted to an unintended device. Therefore, electrical connection between devices can be controlled more appropriately.

Hereinafter, embodiments of the present disclosure will be described with reference to the drawings. In the drawings, the same or corresponding parts are denoted by the same reference characters, and description thereof is not repeated. At least some parts of the embodiments described below may be combined together as desired.

First Embodiment

[Configuration and Basic Operation]
(Connector System)

FIG. 1 shows an application example of a connector system according to the first embodiment of the present disclosure.

With reference to FIG. 1, a connector system 201 includes a first connector (mating connector) 101 and a second connector 102. The first connector 101 and the second connector 102 are mounted on a vehicle, for example.

In more detail, the first connector 101 is connected to, for example, a wire harness 1 provided in a vehicle. The second connector 102 is connected to, for example, an on-vehicle device 2 such as a sensor or an actuator.

While being electrically connected to the wire harness 1, the on-vehicle device 2 transmits ECU (Electronic Control Unit) information such as sensor information or operation information to the wire harness 1 via the second connector 102 and the first connector 101. While being electrically connected to the wire harness 1, the on-vehicle device 2 may receive ECU information such as vehicle information or operation instruction information from the wire harness 1.

The first connector 101 and the second connector 102 are preferably connected to a common ground (GND).

Figure 2:
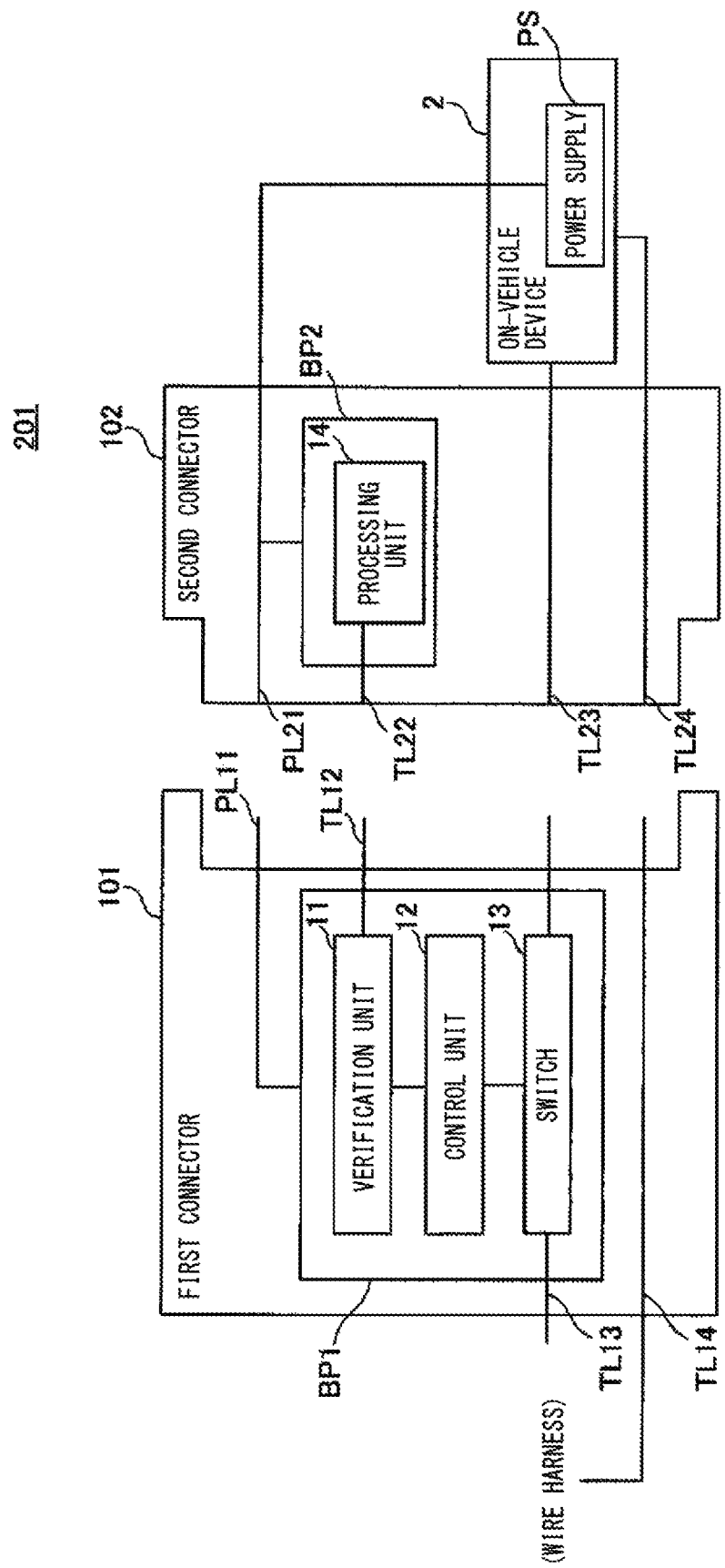
FIG. 2 shows a configuration of the connector system according to the first embodiment of the present disclosure.

FIG. 2 shows the configuration of the connector system according to the first embodiment of the present disclosure.

With reference to FIG. 2, for example, the first connector 101 is a receptacle, and the second connector 102 is a plug.

The first connector 101 includes a verification unit 11, a control unit 12, a switch 13, a power line PL11, a communication line TL12, a communication line (first transmission line) TL13, and a communication line TL14. The verification unit 11, the control unit 12, and the switch 13 are mounted on a base plate BP1, for example.

The second connector 102 includes a processing unit 14, a power line PL21, a communication line TL22, a communication line (second transmission line) TL23, and a communication line TL24. The processing unit 14 is mounted on a base plate BP2, for example, and receives power supplied from a power supply PS in the on-vehicle device 2.

The second connector 102 may include its own power supply, instead of receiving power supplied from the power supply PS in the on-vehicle device 2.

The second connector 102 is attachable/detachable with respect to the first connector 101, for example. In a "connected state" in which the first connector 101 and the second connector 102 are connected to each other, the power line PL11 is connected to the power line PL21, the communication line TL12 is connected to the communication line TL22, the communication line TL13 is connected to the communication line TL23 via the switch 13, and the communication line TL14 is connected to the communication line TL24.

The "connected state" means a state in which the first connector 101 and the second connector 102 are mechanically connected to each other, for example, a state in which the first connector 101 and the second connector 102 are fitted with each other.

When the connected state takes place, power regarding operation of the first connector 101 is supplied from the second connector 102. For example, the verification unit 11, the control unit 12, and the switch 13 start to operate upon receiving power supplied from the power supply PS in the on-vehicle device 2 or from a power supply (not shown) in the second connector 102 via the power line PL21 and the power line PL11. The switch 13 is in its OFF state when the first connector 101 is not connected to the second connector 102, and when the first connector 101 starts to operate.

At least one of the verification unit 11, the control unit 12, and the switch 13 may be operated with power supplied from a source other than the second connector 102.

The verification unit 11 in the first connector 101 performs a verification process of verifying a mating device connected to the first connector 101, and outputs result information A1 indicating the verification result to the control unit 12. The verification process performed by the verification unit 11 will be described later in detail.

Upon receiving the result information A1 outputted from the verification unit 11, the control unit 12 controls the switch 13, based on the result information A1.

The switch 13, in the connected state, selects whether or not to electrically connect the communication line TL13 to the communication line TL23, according to control by the control unit 12.

In more detail, when the result information A1 received from the verification unit 11 indicates that the verification for the mating device connected to the first connector 101 has succeeded, in other words, when the mating device connected to the first connector 101 is the second connector 102, the control unit 12 switches the switch 13 to an ON state. Thus, the communication line TL13 is electrically connected to the communication line TL23, whereby the on-vehicle device 2 becomes able to exchange ECU information with the wire harness 1 via the communication line TL23 and the communication line TL13.

Meanwhile, when the result information A1 received from the verification unit 11 indicates that the verification for the mating device connected to the first connector 101 has failed, in other words, when the mating device connected to the first connector 101 is not the second connector 102, the control unit 12 maintains the switch 13 in the OFF state. Thus, communication between the wire harness 1 and an unintended device is avoided, whereby security is improved.

For example, when the second connector 102 is disconnected from the first connector 101, the first connector 101 is not supplied with power, and the switch 13 is switched from the ON state to the OFF state.

The communication line TL13, the communication line TL23, the communication line TL14, and the communication line TL24 may be communication lines for transmitting digital signals, communication lines for transmitting analog signals, or power lines for transmitting any power.

(Details of Verification Process)

The verification unit 11 in the first connector 101 performs, as a verification process, an authentication process using a digital signature, for example.

In more detail, when the processing unit 14 in the second connector 102 has detected, for example, connection of the first connector 101 and the second connector 102, the processing unit 14 performs an information transmission process of transmitting information regarding verification (hereinafter, also referred to as "verification information").

Specifically, the processing unit 14 creates a public key PK and a private key SK as verification information. The processing unit 14 transmits the created public key PK to the first connector 101 via the communication line TL22 and the communication line TL12, to request random numbers R.

The processing unit 14 is not necessarily configured to create the public key PK and the private key SK. For example, the processing unit 14 may hold at least one of the public key PK and the private key SK in advance.

The verification unit 11 in the first connector 101 receives the public key PK transmitted from the second connector 102 via the communication line TL22 and the communication line TL12, and creates random numbers R. Then, the verification unit 11 transmits the created random numbers R to the second connector 102 via the communication line TL12 and the communication line TL22.

The processing unit 14 in the second connector 102 receives the random numbers R transmitted from the first connector 101 via the communication line TL12 and the communication line TL22, and creates an encrypted digital signature S as verification information by using the created private key SK and the received random numbers R. Then, the processing unit 14 transmits the created digital signature S to the first connector 101 via the communication line TL22 and the communication line TL12.

The verification unit 11 receives the digital signature S transmitted from the second connector 102 via the communication line TL22 and the communication line TL12, and decrypts the digital signature S by using the public key PK. Then, the verification unit 11 performs a verification process for the second connector 102 by using the decrypted digital signature S and the random numbers R, and outputs result information A1 indicating the result of the verification process to the control unit 12.

The verification unit 11 may adopt not only the aforementioned method but also elliptic-curve cryptography such as ECDSA (Elliptic Curve Digital Signature Algorithm), RSA (Rivest Shamir Adleman cryptosystem), DSA (Digital Signature Algorithm), or a verification process using an ID (Identification) and a password.

When performing a verification process using elliptic-curve cryptography, the verification unit 11 preferably creates random numbers R having a bit length not less than 256 bits.

The verification unit 11 may be configured to start the verification process when the first connector 101 and the second connector 102 are connected to each other. For example, when the connected state takes place and the verification unit 11 starts to operate upon receiving power supplied from the second connector 102, the verification unit 11 transmits request information for requesting transmission of verification information, to the second connector 102 via the communication line TL12 and the communication line TL22, thereby starting the verification process.

In this case, the processing unit 14 in the second connector 102 receives the request information from the first connector 101, and starts an information transmission process.

If the verification unit 11 cannot receive verification information transmitted from the second connector 102, for a predetermined period or more from the timing at which the connected state has taken place, that is, the timing at which the verification unit 11 has started to operate, the verification unit 11 may output, to the control unit 12, result information A1 indicating that the verification has failed. Upon receiving, from the verification unit 11, the result information A1 indicating that verification has failed, the control unit 12 maintains the switch 13 in the OFF state.

A power supply may be provided on the first connector 101 side. That is, the first connector 101 may be configured to have a power supply, or receive power supplied from a power supply provided on the wire harness 1 side. In this case, the second connector 102 receives power supplied from the power supply in the on-vehicle device 2 to which the second connector 102 is connected, or power supplied from the power supply on the first connector 101 side.

The verification unit 11 in the first connector 101 may perform the verification process periodically or non-periodically.

Specifically, the processing unit 14 in the second connector 102 transmits, for example, the created digital signature S at predetermined time intervals to the first connector 101 via the communication line TL22 and the communication line TL12.

The verification unit 11 in the first connector 101 performs the verification process periodically or non-periodically. If the verification unit 11 cannot receive a new digital signature S within a predetermined period from the timing at which the last digital signature S has been received, or if verification for a transmission source of a newly received digital signature S has failed, the verification unit 11 outputs result information A1 indicating that the verification has failed, to the control unit 12.

Based on the result of a new verification process performed by the verification unit 11, the control unit 12 determines whether or not to turn off the switch 13. That is, upon receiving, from the verification unit 11, the result information A1 indicating that the verification has failed, the control unit 12 determines to turn off the switch 13, and switches the switch 13 from the ON state to the OFF state.

According to the above configuration, the control unit 12 can detect, for example, disconnection of the second connector 102 from the first connector 101, or connection of a device other than the second connector 102 to the first connector 101, thereby appropriately controlling the switch 13.

The first connector 101 and the second connector 102 may be configured to perform wireless communication, in other words, noncontact communication. However, since many devices are mounted in a vehicle, the first connector 101 and the second connector 102 are preferably configured to perform transmission/reception of verification information and the like through a wire in order to reduce influence of noise.

The first connector 101 and the second connector 102 may be configured not to include the communication line TL14 and the communication line TL24, respectively, which are electrically connected to each other without the switch 13 intervening therebetween in the connected state.

The first connector 101 and the second connector 102 may be configured to include a plurality of transmission lines via the switch 13 in the connected state.

For example, when each of the first connector 101 and the second connector 102 includes a power supply, the connector system 201 need not include the power line PL11 and the power line PL21. For example, when the first connector 101 and the second connector 102 perform wireless communication, the connector system 201 need not include the communication line TL12 and the communication line TL22.

The switch 13 may be in the ON state while the first connector 101 and the second connector 102 are not connected to each other. In this case, the control unit 12 switches the switch 13 from the ON state to the OFF state when the first connector 101 and the second connector 102 are connected to each other, for example.

The first connector 101 and the second connector 102 may be provided in equipment other than a vehicle. For example, instead of being connected to the on-vehicle device 2, the second connector 102 may be connected to a device such as a terminal for performing maintenance or the like of equipment.

<Operation Flow>

Each device in the connector system 201 includes a computer, and an arithmetic processing unit such as a CPU in the computer reads out, from a memory (not shown), a program including a part or all of steps in the following sequence diagram, and executes the program. Programs of the plurality of devices can each be installed from outside. The programs of the plurality of devices are each distributed in a state of being stored in a storage medium.

Figure 3:
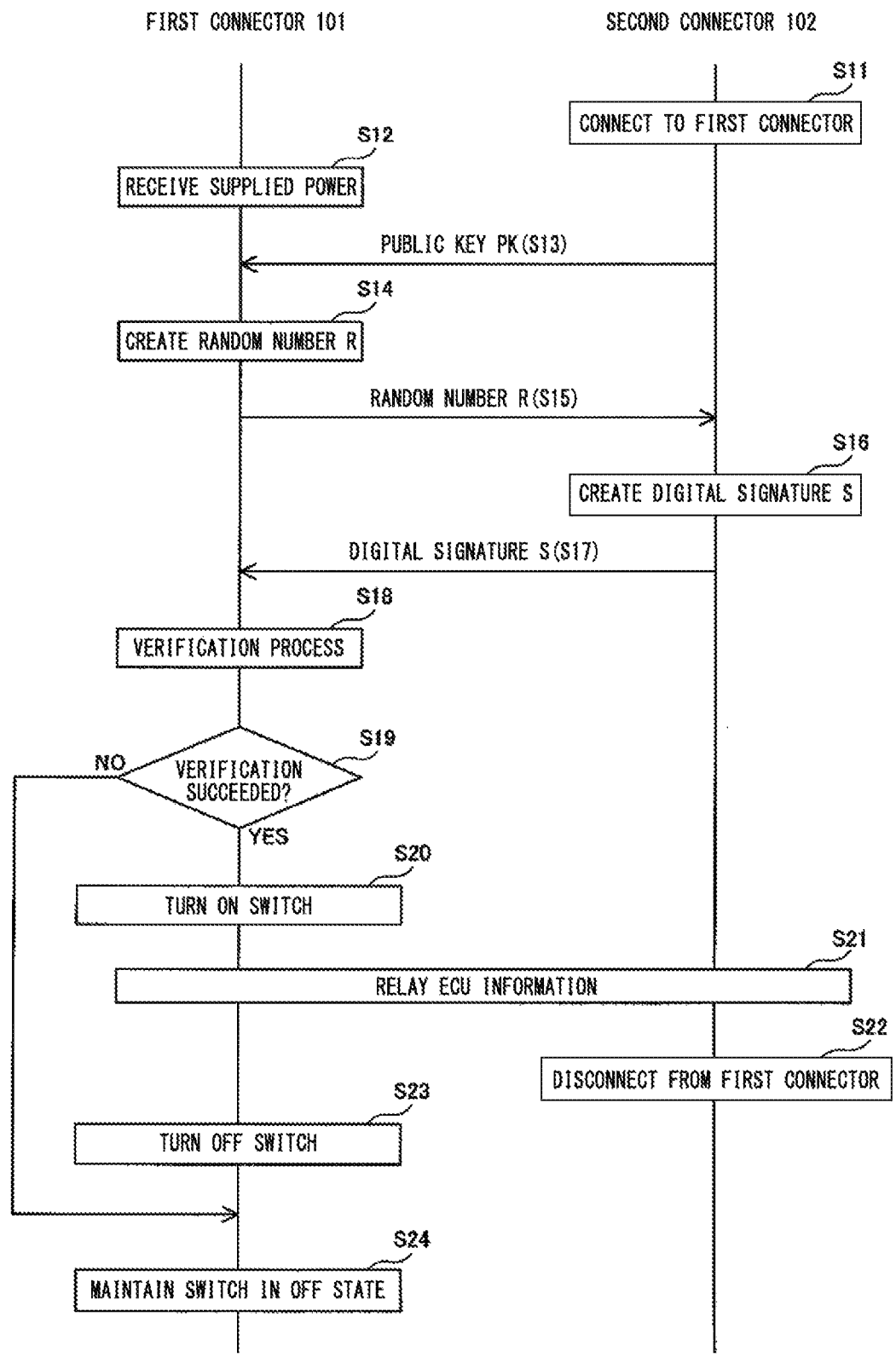
FIG. 3 is a sequence diagram that defines an operation procedure of the connector system according to the first embodiment of the present disclosure.

FIG. 3 is a sequence diagram that defines an operation procedure of the connector system according to the first embodiment of the present disclosure.

With reference to FIG. 2 and FIG. 3, first, the second connector 102 is connected to the first connector 101, for example (step S11).

Next, the first connector 101 receives, via the second connector 102, power supplied from the power supply PS in the on-vehicle device 2 to which the second connector 102 is connected (step S12), for example.

Next, the processing unit 14 in the second connector 102 performs an information transmission process of creating a public key PK and a private key SK, and transmitting the created public key PK to the first connector 101 via the communication line TL22 and the communication line TL12 (step S13).

Next, the verification unit 11 in the first connector 101 receives the public key PK transmitted from the second connector 102, and creates random numbers R (step S14).

Next, the verification unit 11 transmits the created random numbers R to the second connector 102 via the communication line TL12 and the communication line TL22 (step S15).

Next, the processing unit 14 in the second connector 102 receives the random numbers R from the first connector 101 via the communication line TL12 and the communication line TL22, and creates an encrypted digital signature S by using the created private key SK and the received random numbers R (step S16).

Next, the processing unit 14 performs an information transmission process of transmitting the created digital signature S to the first connector 101 via the communication line TL22 and the communication line TL12 (step S17).

Next, the verification unit 11 in the first connector 101 receives the digital signature S from the second connector 102 via the communication line TL22 and the communication line TL12, and decrypts the digital signature S by using the public key PK. Then, the verification unit 11 performs a verification process for the second connector 102 by using the decrypted digital signature S and the random numbers R, and outputs result information A1 indicating the result of the verification process to the control unit 12 (step S18).

When the result information A1 received from the verification unit 11 indicates that the verification for a mating device connected to the first connector 101, i.e., the second connector 102, has succeeded ("YES" in step S19), the control unit 12 switches the switch 13 to the ON state (step S20).

Next, the first connector 101 and the second connector 102 relay ECU information to be transmitted from the on-vehicle device 2 to the wire harness 1 (step S21).

When the second connector 102 is disconnected from the first connector 101 (step S22), supply of power to the first connector 101 is stopped, and the switch 13 is switched to the OFF state (steps S23 and S24).

Meanwhile, when the result information A1 received from the verification unit 11 indicates that the verification for the mating device connected to the first connector 101 has failed ("NO" in step S19), the control unit 12 maintains the switch 13 in the OFF state (step S24).

The switch 13 is not necessarily switched to the OFF state when the second connector 102 is disconnected from the first connector 101 (step S22). In this case, the control unit 12 switches the switch 13 from the ON state to the OFF state upon receiving power supplied from the second connector 102 (step S12).

Disconnection of the second connector 102 from the first connector 101 (step S22) is not necessarily performed after relaying of the ECU information by the first connector 101 and the second connector 102 (step S21), and may be performed at any timing, from step S11 or thereafter.

If the switch 13 is in the OFF state at the timing when the second connector 102 is disconnected, that is, if the second connector 102 is disconnected before step S20, the switch 13 is maintained in the OFF state. On the other hand, if the switch 13 is in the ON state at the timing when the second connector 102 is disconnected, that is, if the second connector 102 is disconnected in step S20 or thereafter, the switch 13 is switched from the ON state to the OFF state (step S23).

In the case where devices are connected to each other via the connector disclosed in Patent Literature 1, for example, the devices can communicate with each other. However, it is difficult to ensure sufficient security for the communication between the devices.

In order to ensure security between the devices, for example, a method of physically covering connected portions of the devices with a cover having a key lock, is conceivable. However, performing locking/unlocking every time the devices are connected/disconnected is troublesome.

A method of transmitting signals that are encrypted in the respective devices, is also conceivable. However, it is difficult to ensure security against a communication signal transmitted from a device having no encryption function. In addition, if a communication signal transmitted from a device is a weak analog signal, encryption of the communication signal cannot be easily performed.

Meanwhile, in the connector system 201 according to the first embodiment of the present disclosure, the first connector 101 includes the communication line TL13. The second connector 102 includes the communication line TL23. The processing unit 14 in the second connector 102 performs the information transmission process of creating verification information and transmitting the verification information to the first connector 101. The switch 13 in the first connector 101 selects whether or not to electrically connect the communication line TL13 and the communication line TL23 to each other, in the state where the first connector 101 and the second connector 102 are connected to each other. The verification unit 11 in the first connector 101 performs the verification process of verifying the second connector 102, based on the verification information received from the second connector 102. Then, the control unit 12 in the first connector 101 controls the switch 13, based on the result of the verification process performed by the verification unit 11.

As described above, since the electrical connection between the communication line TL13 and the communication line TL23 is switched based on the result of the verification process performed by the first connector 101, communication between the wire harness 1 and an unintended device can be avoided, whereby security can be ensured.

Therefore, in the connector system 201 according to the first embodiment of the present disclosure, electrical connection between devices can be controlled more appropriately.

In the connector system 201 according to the first embodiment of the present disclosure, the first connector 101 and the second connector 102 include additional transmission lines that are electrically connected to each other without the switch 13 intervening therebetween, in the state where the first connector 101 and the second connector 102 are connected to each other.

In this configuration, since the connector system 201 is provided with transmission lines for ensuring security and transmission lines that do not need security to be ensured, connection modes between various devices can be provided.

In the connector system 201 according to the first embodiment of the present disclosure, power regarding the operation of the first connector 101 is supplied from the second connector 102.

In this configuration, even when the first connector 101 does not include a power supply, the first connector 101 can perform operations such as verification while being supplied with the power from the second connector 102.

In the connector system 201 according to the first embodiment of the present disclosure, the verification unit 11 starts the verification process immediately after the first connector 101 and the second connector 102 are connected to each other, that is, immediately after the power is supplied from the second connector 102.

Since the first connector 101 proactively starts the verification process, the second connector 102 is allowed to perform the information transmission process earlier.

In the connector system 201 according to the first embodiment of the present disclosure, the processing unit 14 starts the information transmission process upon receiving a request for the verification information from the first connector 101.

In this configuration, for example, even when connection to the first connector 101 is not detected in the second connector 102, the first connector 101 can perform the verification process by causing the second connector 102 to transmit the verification information.

In the connector system 201 according to the first embodiment of the present disclosure, the verification unit 11 performs the verification process periodically or non-periodically. Then, the control unit 12 turns on the switch 13 based on the result of the verification process performed by the verification unit 11, and thereafter determines whether or not to turn off the switch 13 based on the result of a new verification process.

In this configuration, for example, after the verification process for the second connector 102 has succeeded, disconnection of the second connector 102 from the first connector 101 can be detected through the new verification process. Therefore, the switch 13 can be controlled according to a change in the connected state.

In the connector system 201 according to the first embodiment of the present disclosure, the switch 13 is in the OFF state when the first connector 101 and the second connector 102 are not connected to each other. When verification information has not been received for a predetermined period or more, the verification unit 11 notifies the control unit 12 that the verification has failed. When the control unit 12 is notified of the failure of verification from the verification unit 11, the control unit 12 maintains the switch 13 in the OFF state.

In this configuration, for example, communication between the first connector 101 and a device, which does not transmit verification information for a predetermined period or more from the timing at which the device has been connected to the first connector 101, can be avoided, whereby security is ensured more reliably.

Furthermore, for example, communication between the first connector 101 and a device, which does not transmit a new digital signature S for a predetermined period or more from the timing at which the device has transmitted a previous digital signature S, can be avoided, whereby security is ensured more reliably.

In the connector system 201 according to the first embodiment of the present disclosure, the verification unit 11, in the verification process, receives verification information from the processing unit 14 through a wire.

In this configuration, even when a plurality of connectors are present in a neighboring area, unintended connection and inhibition of correct communication can be avoided. In addition, even when multiple connectors adopting the same connection method as that adopted between the first connector 101 and the second connector 102 are present in the neighboring area, appropriate connection can be performed.

Even when the first connector 101 and the second connector 102 are provided under an environment where they are likely to be influenced by noise, the influence of noise can be reduced.

In the connector system 201 according to the first embodiment of the present disclosure, the first connector 101 and the second connector 102 are mounted on a vehicle.

In this configuration, even when a plurality of connectors are present in a neighboring area, the first and second connectors 101 and 102 can be normally operated. Further, in an environment where multiple devices are present and noise is large, influence of noise can be reduced.

In the first connector 101 according to the first embodiment of the present disclosure, the switch 13 selects whether or not to electrically connect the communication line TL13 in the first connector 101 to the communication line TL23 in the second connector 102, in the state where the first connector 101 and the second connector 102 are connected to each other. The verification unit 11 performs the verification process of verifying a mating device connected to the first connector 101. Then, the control unit 12 controls the switch 13, based on the result of the verification process performed by the verification unit 11.

Since the electrical connection between the communication line TL13 and the communication line TL23 is switched based on the result of the verification process performed by the first connector 101, communication between the wire harness 1 and an unintended device is avoided, whereby security is ensured.

Therefore, in the first connector 101 according to the first embodiment of the present disclosure, electrical connection between devices can be controlled more appropriately.

The first connector 101 according to the first embodiment of the present disclosure is mounted on a vehicle.

In this configuration, even when a plurality of connectors are present in a neighboring area, unintended connection and inhibition of correct communication can be avoided. In addition, even when multiple connectors adopting the same connection method as that adopted between the first connector 101 and the second connector 102 are present in the neighboring area, appropriate connection can be performed.

Under an environment where multiple devices are present and noise is large, electrical connection between devices can be controlled more appropriately.

The second connector 102 according to the first embodiment of the present disclosure is a connector that is connectable to the first connector 101 including the communication line TL13. The second connector 102 includes: the processing unit 14 configured to create verification information and transmit the verification information to the first connector 101; and the communication line TL23. The switch 13 in the first connector 101 selects whether or not to electrically connect the communication line TL13 and the communication line TL23 to each other, in the state where the second connector 102 is connected to the first connector 101. The verification unit 11 in the first connector 101 performs the verification process to verify the second connector 102, based on the verification information. The control unit 12 in the first connector 101 controls the switch 13, based on the result of the verification process.

In the above configuration, in the first connector 101, the verification process for the second connector 102 can be performed by using the verification information transmitted from the second connector 102, and the electrical connection between the communication line TL13 and the communication line TL23 can be switched based on the result of the verification process. Thus, communication between the wire harness 1 and an unintended device can be avoided, whereby security can be ensured.

Therefore, in the second connector 102 according to the first embodiment of the present disclosure, electrical connection between devices can be controlled more appropriately.

In the connection method according to the first embodiment of the present disclosure, first, the processing unit 14 in the second connector 102 performs the information transmission process of creating verification information and transmitting the verification information to the first connector 101. Next, the verification unit 11 in the first connector 101 performs the verification process of verifying the second connector 102, based on the verification information received from the second connector 102. Next, the control unit 12 in the first connector 101 controls the switch 13, based on the result of the verification process.

Since the electrical connection between the communication line TL13 and the communication line TL23 is switched based on the result of the verification process performed by the first connector 101, communication between the wire harness 1 and an unintended device is avoided, whereby security can be ensured.

Therefore, in the connection method according to the first embodiment of the present disclosure, electrical connection between devices can be controlled more appropriately.

Hereinafter, other embodiments of the present disclosure will be described with reference to the drawings. In the drawings, the same or corresponding parts are denoted by the same reference signs, and descriptions thereof are not repeated.

Second Embodiment

In the connector system 201 according to the first embodiment of the present disclosure described above, the first connector 101 performs a verification process for a mating device connected thereto. In contrast to the first embodiment, in a connector system 202 according to the second embodiment of the present disclosure, a first connector 111 and a second connector 112 mutually perform verification processes for the mating connectors.

Figure 4:
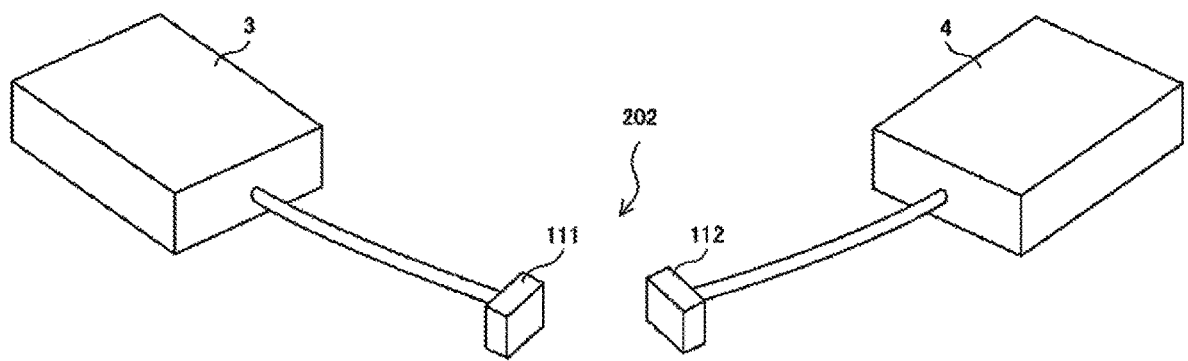
FIG. 4 shows an application example of a connector system according to a second embodiment of the present disclosure.

FIG. 4 shows an application example of a connector system according to the second embodiment of the present disclosure.

With reference to FIG. 4, in the connector system 202, the first connector 111 and the second connector 112 are connected to, for example, communication devices that exchange signals with each other and are mounted in equipment other than a vehicle. For example, the first connector 111 is connected to a communication device 3 while the second connector 112 is connected to a communication device 4.

The communication device 3 and the communication device 4, while being electrically connected to each other, exchange communication signals via the second connector 112 and the first connector 111.

Figure 5:
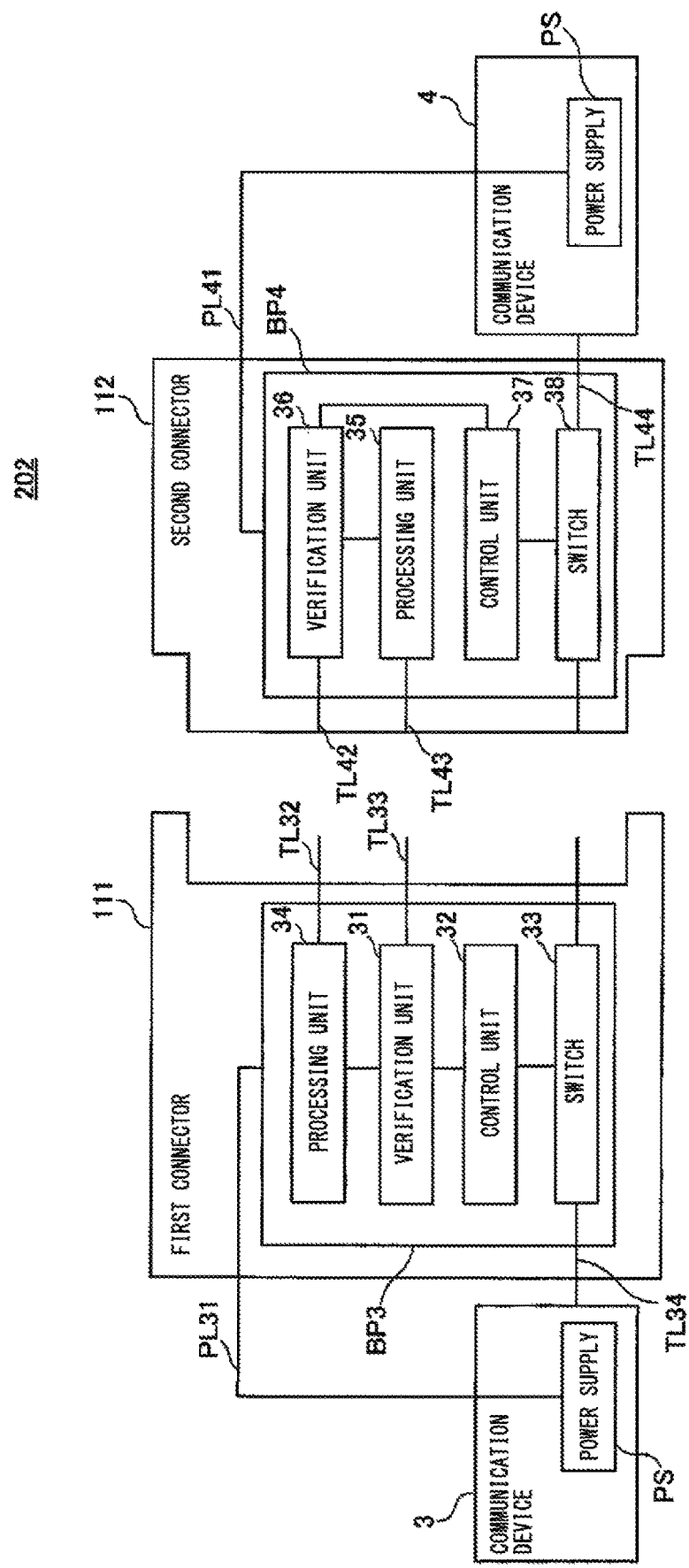
FIG. 5 shows a configuration of the connector system according to the second embodiment of the present disclosure.

FIG. 5 shows the configuration of the connector system according to the second embodiment of the present disclosure.

With reference to FIG. 5, the first connector 111 includes a verification unit 31, a control unit 32, a switch 33, a processing unit 34, a power line PL31, a communication line TL32, a communication line TL33, and a communication line (first transmission line) TL34. The verification unit 31, the control unit 32, the switch 33, and the processing unit 34 are mounted on a base plate BP3, for example. The structures and operations of the verification unit 31, the control unit 32, and the switch 33 are identical to those of the verification unit 11, the control unit 12, and the switch 13 shown in FIG. 2, except for the content described below.

The second connector 112 includes a processing unit 35, a verification unit 36, a control unit 37, a switch 38, a power line PL41, a communication line TL42, a communication line TL43, and a communication line (second transmission line) TL44. The processing unit 35, the verification unit 36, the control unit 37, and the switch 38 are mounted on a base plate BP4, for example. The structure and operation of the processing unit 35 are identical to those of the processing unit 14 shown in FIG. 2, except for the content described below. The switch 38 is in its OFF state when the first connector 111 and the second connector 112 are not connected to each other, and when the second connector 112 starts to operate.

The second connector 112 is attachable/detachable with respect to the first connector 111, for example. In a connected state in which the first connector 111 and the second connector 112 are connected to each other, the communication line TL32 is connected to the communication line TL42, the communication line TL33 is connected to the communication line TL43, and the communication line TL34 is connected to the communication line TL44 via the switch 33 and the switch 38.

The communication line TL34 and the communication line TL44 may be communication lines for transmitting digital signals, communication lines for transmitting analog signals, or power lines for transmitting any power.

The first connector 111 and the second connector 112 mutually perform verification processes for the mating devices connected thereto, for example.

In more detail, the verification unit 36 in the second connector 112 detects connection/disconnection of the first connector 111 to/from the second connector 112. Upon detecting that the first connector 111 is connected, the verification unit 36 outputs detection information indicating the detection result to the processing unit 35.

Upon receiving, from the verification unit 36, the detection information indicating that the first connector 111 is connected, the processing unit 35 creates verification information, and transmits the created verification information to the first connector 111 via the communication line TL43 and the communication line TL33.

Like the verification unit 11 shown in FIG. 2, the verification unit 31 in the first connector 111 receives the verification information transmitted from the second connector 112 via the communication line TL43 and the communication line TL33, and performs, based on the received verification information, a verification process for verifying the mating device connected to the first connector 111, and outputs result information A1 indicating the verification result to the control unit 32.

The verification unit 31 in the first connector 111 detects, for example, connection/disconnection of the second connector 112 to/from the first connector 111. Upon detecting that the second connector 112 is connected, the verification unit 31 outputs detection information indicating the detection result to the processing unit 34.

Upon receiving, from the verification unit 31, the detection information indicating that the second connector 112 is connected, the processing unit 34 creates verification information, and transmits the created verification information to the second connector 112 via the communication line TL32 and the communication line TL42.

The verification unit 36 in the second connector 112 receives the verification information transmitted from the first connector 111 via the communication line TL32 and the communication line TL42, and performs a verification process for the first connector 111 by using the verification information. Then, the verification unit 36 outputs result information A2 indicating the result of the verification process to the control unit 37.

Creation of the verification information (i.e., a public key PK, a private key SK, and a digital signature S) by the processing unit 34 and the verification process performed by the verification unit 36 are identical to the creation of the verification information by the processing unit 14 and the verification process performed by the verification unit 11 shown in FIG. 2, respectively.

The control unit 32 in the first connector 111 receives the result information A1 outputted from the verification unit 31. When the result information A1 indicates that the verification for the mating device connected to the first connector 111 has succeeded, the control unit 32 switches the switch 33 to the ON state.

The control unit 37 in the second connector 112 receives the result information A2 outputted from the verification unit 36. When the result information A2 indicates that the verification for the mating device connected to the second connector 112 has succeeded, the control unit 37 switches the switch 38 to the ON state.

Thus, the communication line TL34 and the communication line TL44 are electrically connected to each other. Thus, the communication device 3 and the communication device 4 become able to exchange communication signals with each other via the communication line TL34 and the communication line TL44.

Meanwhile, when the verification unit 31 in the first connector 111 detects that the second connector 112 has been disconnected from the first connector 111, the verification unit 31 outputs detection information indicating the detection result to the control unit 32. Upon receiving, from the verification unit 31, the detection information indicating the disconnection of the second connector 112, the control unit 32 switches the switch 33 from the ON state to the OFF state.

Meanwhile, when the verification unit 36 in the second connector 112 detects that the first connector 111 has been disconnected from the second connector 112, the verification unit 36 outputs detection information indicating the detection result to the control unit 37. Upon receiving, from the verification unit 36, the detection information indicating the disconnection of the first connector 111, the control unit 37 switches the switch 38 from the ON state to the OFF state.

Since the first connector 111 and the second connector 112 are configured to mutually perform the verification processes, higher security can be ensured between the communication device 3 and the communication device 4.

The verification unit 31 may be configured to perform the verification process periodically or non-periodically. In this case, the verification unit 31 can detect disconnection of the second connector 112 by checking whether or not a new digital signature S has been received within a predetermined period from the timing at which the previous digital signature S was received. When a new digital signature S has not been received within the predetermined period from the timing at which the previous digital signature S was received, the verification unit 31 outputs result information A1 indicating that the verification has failed, to the control unit 32.

The verification unit 36 may be configured to perform the verification process periodically or non-periodically. In this case, the verification unit 36 can detect disconnection of the first connector 111 by checking whether or not a new digital signature S has been received within a predetermined period from the timing at which the previous digital signature S was received. When a new digital signature S has not been received within the predetermined period from the timing at which the previous digital signature S was received, the verification unit 36 outputs result information A2 indicating that the verification has failed, to the control unit 37.

The first connector 111 and the second connector 112 may be mounted on a vehicle.

<Operation Flow>

Figure 6:
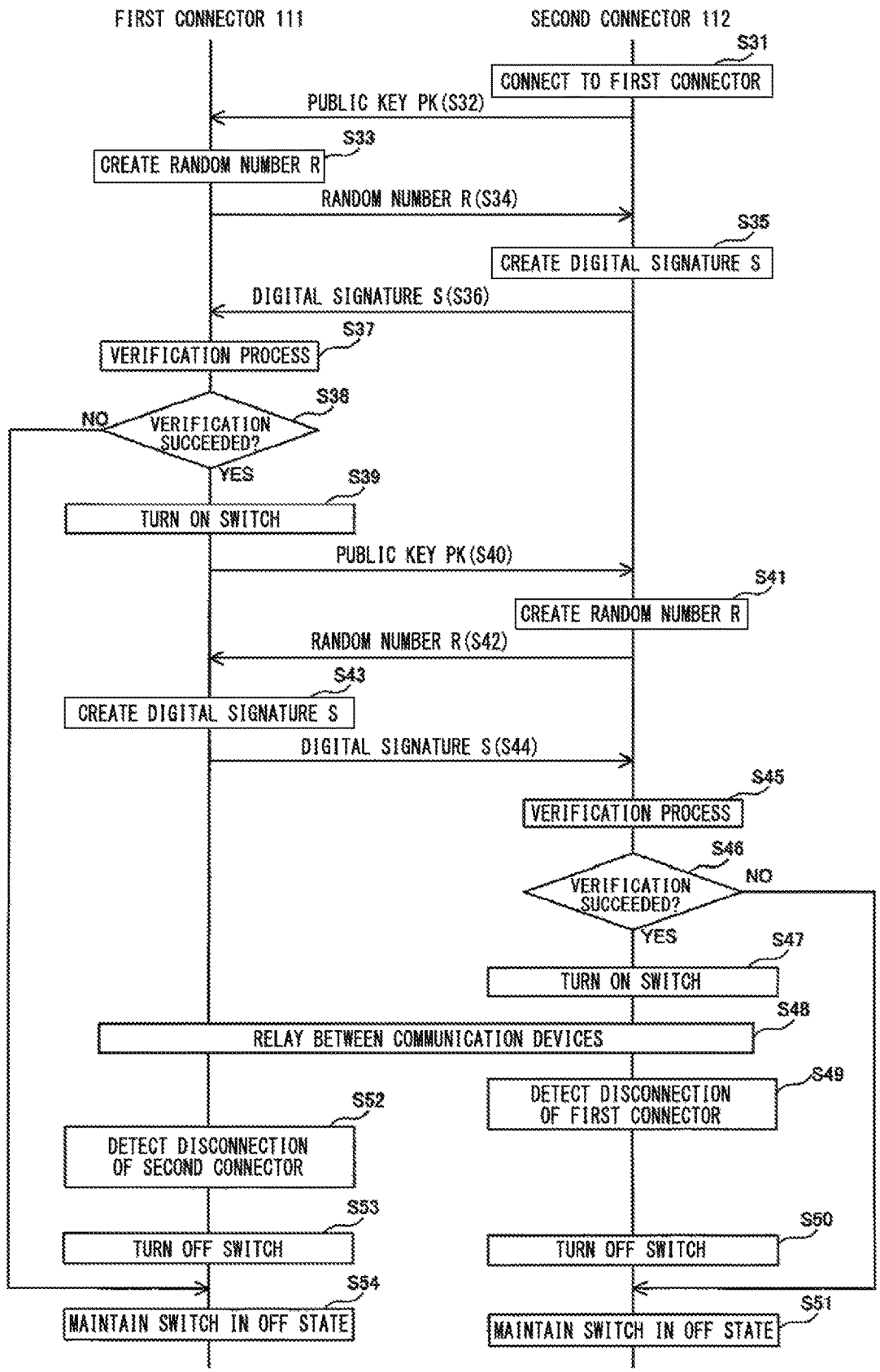
FIG. 6 is a sequence diagram that defines an operation procedure of the connector system according to the second embodiment of the present disclosure.

FIG. 6 is a sequence diagram that defines an operation procedure of the connector system according to the second embodiment of the present disclosure.

With reference to FIG. 5 and FIG. 6, first, the second connector 112 is connected to the first connector 111, for example (step S31).

Next, the processing unit 35 in the second connector 112 performs an information transmission process of creating a public key PK and a private key SK, and transmitting the created public key PK to the first connector 111 via the communication line TL33 and the communication line TL43 (step S32).

Next, the verification unit 31 in the first connector 111 receives the public key PK transmitted from the second connector 112, and creates random numbers R (step S33).

Next, the verification unit 31 transmits the created random numbers R to the second connector 112 via the communication line TL33 and the communication line TL43 (step S34).

Next, the processing unit 35 in the second connector 112 receives the random numbers R from the first connector 111, and creates an encrypted digital signature S by using the created private key SK and the received random numbers R (step S35).

Next, the processing unit 35 performs an information transmission process of transmitting the created digital signature S to the first connector 111 via the communication line TL43 and the communication line TL33 (step S36).

Next, the verification unit 31 in the first connector 111 receives the digital signature S from the second connector 112, and decrypts the digital signature S by using the public key PK. Then, the verification unit 31 performs a verification process for the second connector 112 by using the encrypted digital signature S and the random numbers R, and outputs result information A1 indicating the result of the verification process to the control unit 32 (step S37).

Based on the result information A1, the control unit 32 checks whether or not the verification for the second connector 112 has succeeded (step S38). When the verification for the second connector 112 has succeeded ("YES" in step S38), the control unit 32 switches the switch 33 to the ON state (step S39).

Next, the processing unit 34 in the first connector 111 performs an information transmission process of creating a public key PK and a private key SK, and transmitting the created public key PK to the second connector 112 via the communication line TL32 and the communication line TL42 (step S40).

Next, the verification unit 36 in the second connector 112 receives the public key PK transmitted from the first connector 111, and creates random numbers R (step S41).

Next, the verification unit 36 transmits the created random numbers R to the first connector 111 via the communication line TL42 and the communication line TL32 (step S42).

Next, the processing unit 34 in the first connector 111 receives the random numbers R from the second connector 112, and creates an encrypted digital signature S by using the created private key SK and the received random numbers R (step S43).

Next, the processing unit 34 performs an information transmission process of transmitting the created digital signature S to the second connector 112 via the communication line TL32 and the communication line TL42 (step S44).

Next, the verification unit 36 in the second connector 112 receives the digital signature S from the first connector 111, and decrypts the digital signature S by using the public key PK. Then, the verification unit 36 performs a verification process for the first connector 111 by using the decrypted digital signature S and the random numbers R, and outputs result information A2 indicating the result of the verification process to the control unit 37 (step S45).

Based on the result information A2, the control unit 37 checks whether or not the verification for the first connector 111 has succeeded (step S46). When the verification for the first connector 111 has succeeded ("YES" in step S46), the control unit 37 switches the switch 38 to the ON state (step S47).

Next, the first connector 111 and the second connector 112 relay communication signals exchanged between the communication device 3 and the communication device 4 shown in FIG. 4 (step S48).

Next, for example, the verification unit 36 in the second connector 112 detects that the first connector 111 has been disconnected, and outputs detection information indicating the detection result to the control unit 37 (step S49).

Next, the control unit 37 receives, from the verification unit 36, the detection information indicating the disconnection of the second connector 112, and switches the switch 38 from the ON state to the OFF state (steps S50 and S51).

Meanwhile, based on the result information A2, when the verification for the first connector 111 has failed, in other words, when the second connector 112 is connected to a device other than the first connector 111 ("NO" in step S46), the control unit 37 in the second connector 112 maintains the switch 38 in the OFF state (step S51).

Next, the verification unit 31 in the first connector 111 detects that the second connector 112 has been disconnected, and outputs detection information indicating the detection result to the control unit 32 (step S52).

Next, upon receiving, from the verification unit 31, the detection information indicating the disconnection of the second connector 112, the control unit 32 switches the switch 33 from the ON state to the OFF state (steps S53 and S54).

Meanwhile, based on the result information A1, when the verification for the second connector 112 has failed, in other words, when the first connector 111 is connected to a device other than the second connector 112 ("NO" in step S38), the control unit 32 in the first connector 111 maintains the switch 33 in the OFF state (step S54).

The operations in steps S32 to S39 by the first connector 111 and the second connector 112 may be performed after the operations in steps S40 to S47 by the first connector 111 and the second connector 112. Alternatively, the operations in steps S32 to S39 by the first connector 111 and the second connector 112 may be performed simultaneously with the operations in steps S40 to S47 by the first connector 111 and the second connector 112.

Disconnection between the first connector 111 and the second connector 112 (step S49, S52) is not necessarily performed after relaying of the communication signal by the first connector 111 and the second connector 112 (step S48), and may be performed at any timing, from step S31 or thereafter.

If the switch 33 is in the OFF state at the timing when the first connector 111 and the second the connector 112 are disconnected from each other, that is, if the first connector 111 and the second connector 112 are disconnected from each other before step S39, the switch 33 is maintained in the OFF state.

If the switch 33 is in the ON state and the switch 38 is in the OFF state at the timing when the first connector 111 and the second connector 112 are disconnected from each other, that is, if the first connector 111 and the second connector 112 are disconnected from each other after step S39 and before step S47, the switch 33 is switched from the ON state to the OFF state while the switch 38 is maintained in the OFF state.

If both the switch 33 and the switch 38 are in the ON states at the timing when the first connector 111 and the second connector 112 are disconnected from each other, that is, if the first connector 111 and the second connector 112 are disconnected from each other in step S47 or thereafter, both the switch 33 and the switch 38 are switched from the ON states to the OFF states (step S53, S50).

As described above, in the connector system 202 according to the second embodiment of the present disclosure, the first connector 111 includes the communication lines TL32 and TL33. The second connector 112 includes the communication lines TL42 and TL43. The processing unit 35 in the second connector 112 performs the information transmission process of creating verification information, and transmitting the verification information to the first connector 111. The switch 33 in the first connector 111 selects whether or not to electrically connect the communication line TL34 and the communication line TL44 to each other, in the state where the first connector 111 and the second connector 112 are connected to each other. The verification unit 31 in the first connector 111 performs the verification process of verifying the second connector 112, based on the verification information received from the second connector 112. Then, the control unit 32 in the first connector 111 controls the switch 33, based on the result of the verification process performed by the verification unit 31.

The processing unit 34 in the first connector 111 performs the information transmission process of creating verification information and transmitting the verification information to the second connector 112. The switch 38 in the second connector 112 selects whether or not to electrically connect the communication line TL34 and the communication line TL44 to each other, in the state where the first connector 111 and the second connector 112 are connected to each other. The verification unit 36 in the second connector 112 performs the verification process of verifying the first connector 111, based on the verification information received from the first connector 111. Then, the control unit 37 in the second connector 112 controls the switch 38, based on the result of the verification process performed by the verification unit 36.

As described above, since the electrical connection between the communication line TL34 and the communication line TL44 is switched based on the result of the verification process performed by the first connector 111 and on the result of the verification process performed by the second connector 112, communication between unintended devices is avoided, whereby security can be ensured.

Therefore, in the connector system 202 according to the second embodiment of the present disclosure, electrical connection between devices can be controlled more appropriately.

The communication line TL32 and the communication line TL33 in the first connector 111 may be implemented as a single communication line. Likewise, the communication line TL42 and the communication line TL43 in the second connector 112 may be implemented as a single communication line.

Since other components and operations thereof are identical to those of the connector system 201 according to the first embodiment of the present disclosure, detailed descriptions thereof are not repeated.

Third Embodiment

In a connector system 203 according to the third embodiment of the present disclosure, a first connector 131 and a second connector 132 relay transmission of power via power lines.

Figure 7:
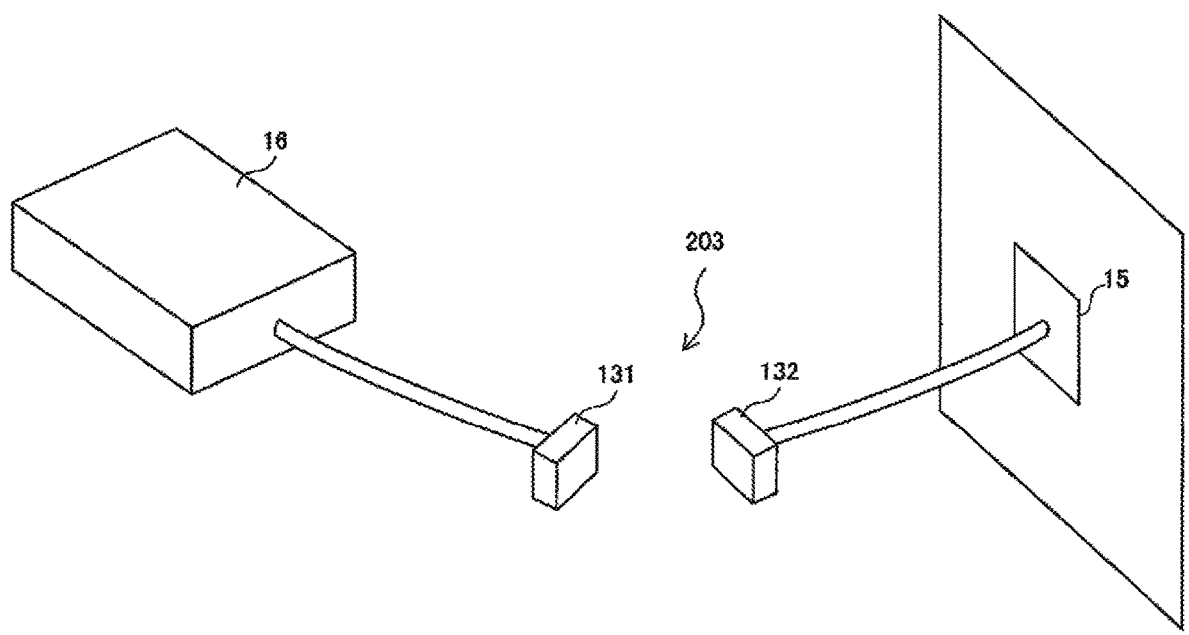
FIG. 7 shows an application example of a connector system according to a third embodiment of the present disclosure.

FIG. 7 shows an application example of the connector system according to the third embodiment of the present disclosure.

With reference to FIG. 7, the first connector 131 is connected to an electric device 16, for example. The second connector 132 is connected to a receptacle 15, for example. While being electrically connected to the receptacle 15, the electric device 16 receives power supplied from the receptacle 15 side via the first connector 131 and the second connector 132.

Figure 8:
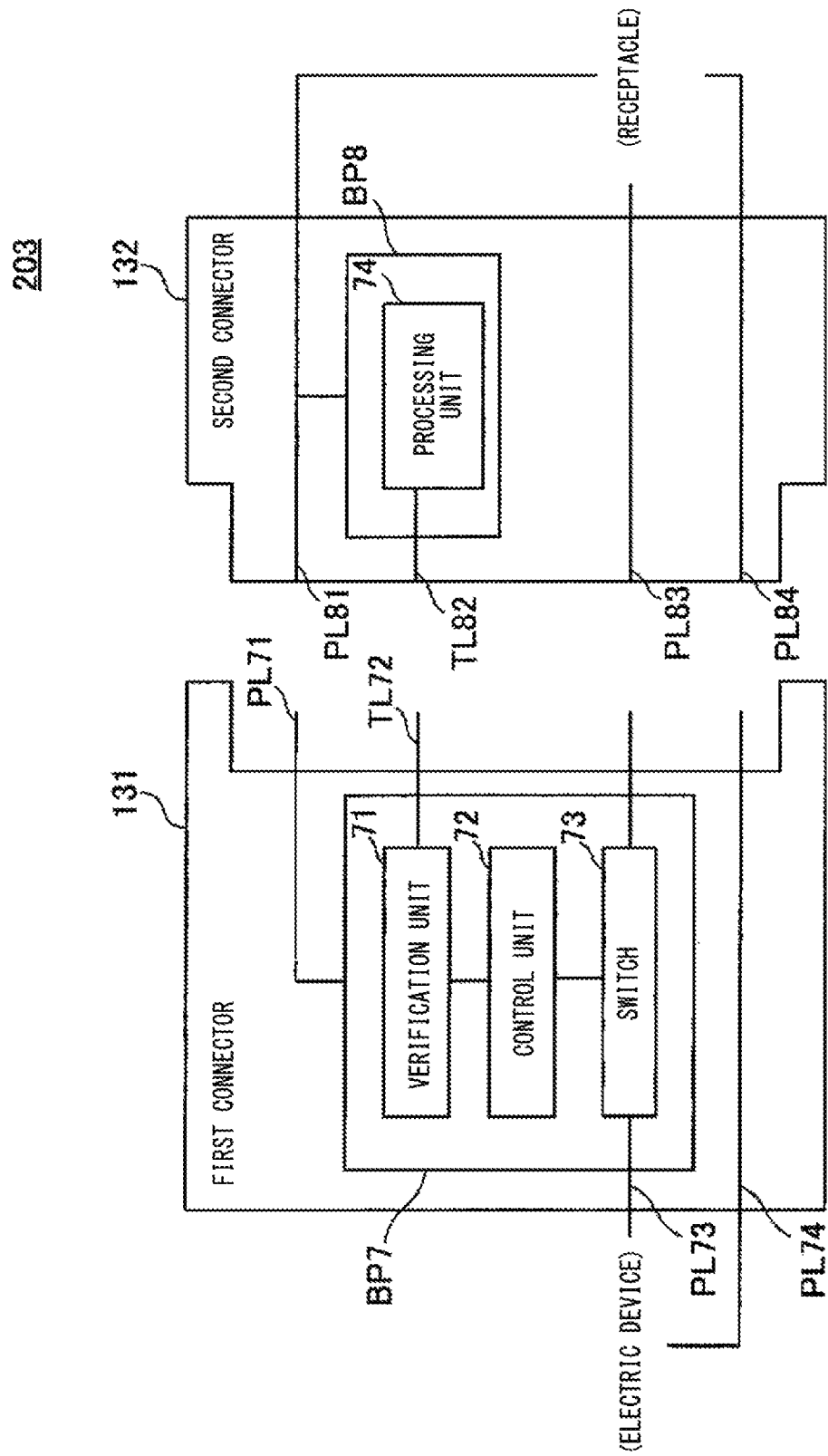
FIG. 8 shows a configuration of the connector system according to the third embodiment of the present disclosure.

FIG. 8 shows the configuration of the connector system according to the third embodiment of the present disclosure.

With reference to FIG. 8, the first connector 131 includes a verification unit 71, a control unit 72, a switch 73, a power line PL71, a communication line TL72, a power line (first transmission line) PL73, and a power line PL74. The verification unit 71, the control unit 72, and the switch 73 are mounted on a base plate BP7, for example. The structures and operations of the verification unit 71, the control unit 72, and the switch 73 are identical to those of the verification unit 11, the control unit 12, and the switch 13 shown in FIG. 2.

The second connector 132 includes a processing unit 74, a power line PL81, a communication line TL82, a power line (second transmission line) PL83, and a power line PL84. The processing unit 74 is mounted on a base plate BP8, for example. The structure and operation of the processing unit 74 are identical to those of the processing unit 14 shown in FIG. 2.

That is, the verification unit 71 in the first connector 131 performs a verification process for the second connector 132, and outputs result information A1 indicating a verification result to the control unit 72. The control unit 72 receives the result information A1 outputted from the verification unit 71, and switches the switch 73 to the ON state when the result information A1 indicates that the verification for the second connector 132 has succeeded.

Thus, the power line PL73 and the power line PL83 are electrically connected to each other. This enables the electric device 16 to receive power supplied from the receptacle 15 side via the power line PL83 and the power line PL73.

Meanwhile, when the result information A1 received from the verification unit 71 indicates that the verification for a mating device connected to the first connector 131 has failed, in other words, when the mating device connected to the first connector 131 is a device different from the second connector 132, the control unit 72 maintains the switch 73 in the OFF state.

The power supplied from the second connector 132 to the first connector 131 may be AC power or DC power. When the power supplied to the first connector 131 is AC power, for example, an AC/DC converter (not shown) included in the first connector 131 converts the AC power to DC power. However, since such an AC/DC converter causes an increase in the size of the first connector 131, the power supplied to the first connector 131 is preferably DC power.

In the connector system 203 according to the third embodiment of the present disclosure, the first connector 131 includes the power line PL73. The second connector 132 includes the power line PL83. The processing unit 74 in the second connector 132 performs the information transmission process of creating verification information, and transmitting the verification information to the first connector 131. The switch 73 in the first connector 131 selects whether or not to electrically connect the power line PL73 and the power line PL83 to each other, in the state where the first connector 131 and the second connector 132 are connected to each other. The verification unit 71 in the first connector 131 performs the verification process of verifying the second connector 132, based on the verification information received from the second connector 132. The control unit 72 in the first connector 131 controls the switch 73, based on the result of the verification process performed by the verification unit 71.

As described above, the electrical connection between the power line PL73 and the power line PL83 is switched based on the result of the verification process performed by the first connector 131. Therefore, when the power line PL73 and the power line PL83 perform transmission of power, the power is prevented from being transmitted to an unintended device.

Therefore, in the connector system 203 according to the third embodiment of the present disclosure, electrical connection between devices can be controlled more appropriately.

Since other components and operations thereof are identical to those of the connector system 201 according to the first embodiment of the present disclosure, detailed descriptions thereof are not repeated.

Fourth Embodiment

In a connector system 204 according to the fourth embodiment of the present disclosure, a first connector 121 and a second connector 122 are connected to a receptacle 5 and a plug 7, respectively, and relay transmission of power via power lines.

Figure 9:
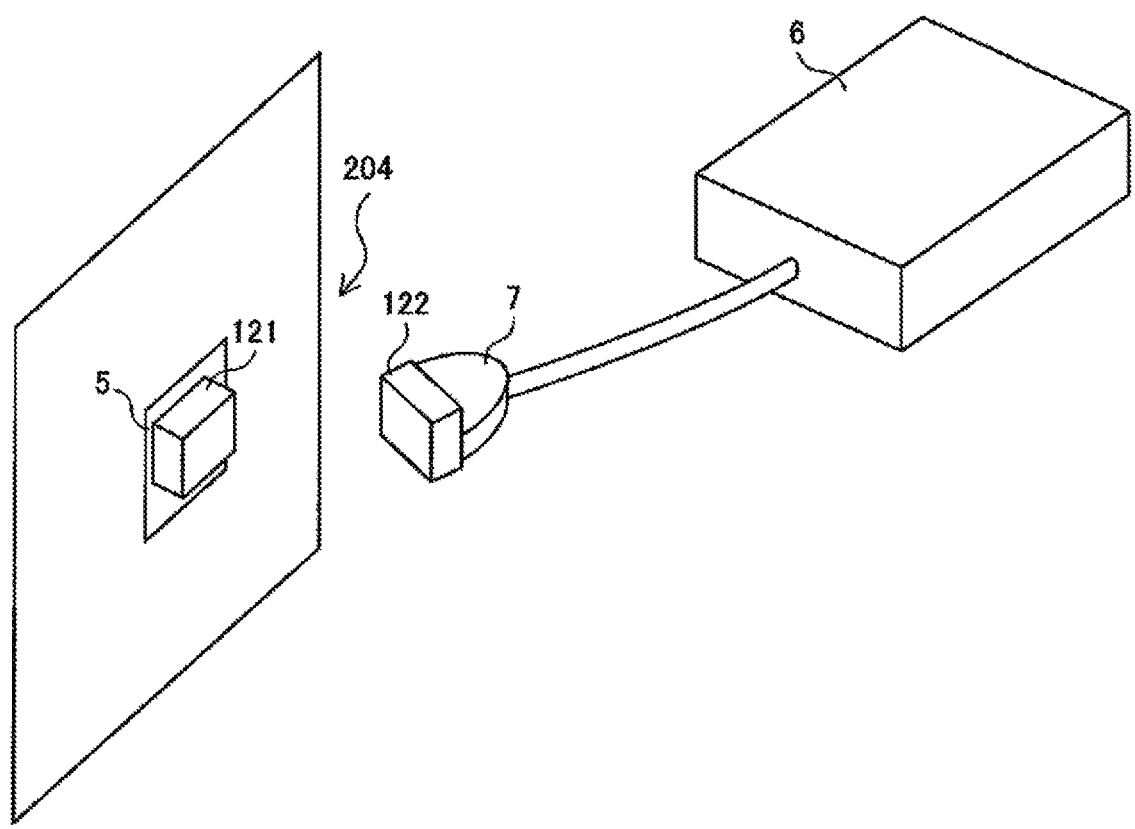
FIG. 9 shows an application example of a connector system according to a fourth embodiment of the present disclosure.

FIG. 9 shows an application example of the connector system according to the fourth embodiment of the present disclosure.

With reference to FIG. 9, in the connector system 204 according to the fourth embodiment of the present disclosure, the first connector 121 is connected to the receptacle 5, for example. The second connector 122 is connected to the plug 7 of an electric device 6, for example. While being electrically connected to the receptacle 5, the electric device 6 receives power supplied from the receptacle 5 side via the first connector 121 and the second connector 122.

Figure 10:
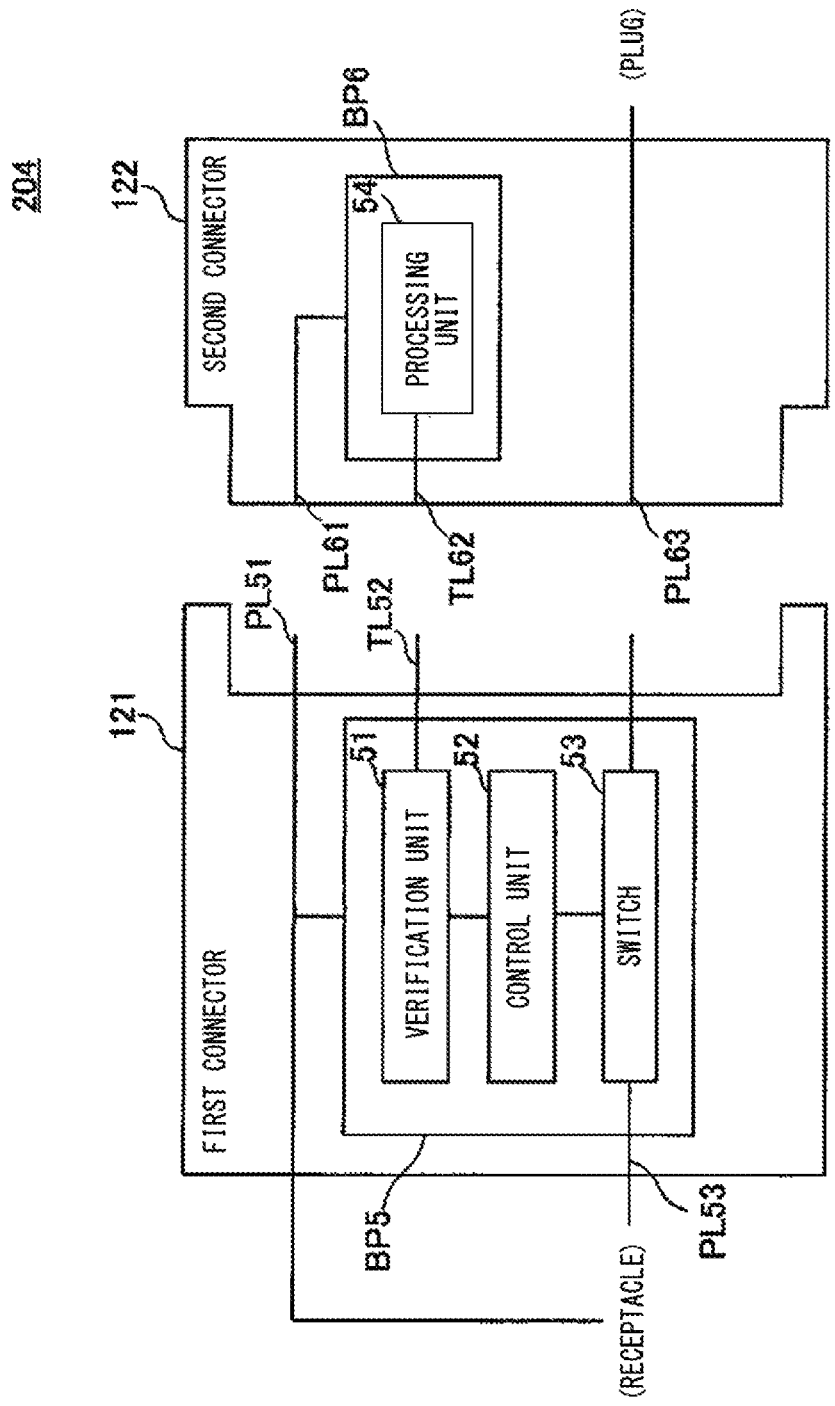
FIG. 10 shows a configuration of the connector system according to the fourth embodiment of the present disclosure.

FIG. 10 shows the configuration of the connector system according to the fourth embodiment of the present disclosure.

With reference to FIG. 10, the first connector 121 includes a verification unit 51, a control unit 52, a switch 53, a power line PL51, a communication line TL52, and a power line (first transmission line) PL53. The verification unit 51, the control unit 52, and the switch 53 are mounted on a base plate BP5, for example. The structures and operations of the verification unit 51, the control unit 52, and the switch 53 are identical to those of the verification unit 11, the control unit 12, and the switch 13 shown in FIG. 2, except for the content described below.

The second connector 122 includes a processing unit 54, a power line PL61, a communication line TL62, and a power line (second transmission line) PL63. The processing unit 54 is mounted on a base plate BP6, for example. The structure and operation of the processing unit 54 are identical to those of the processing unit 14 shown in FIG. 2, except for the content described below.

The second connector 122 is attachable/detachable with respect to the first connector 121, for example. In a connected state in which the first connector 121 and the second connector 122 are connected to each other, the power line PL51 is connected to the power line PL61, the communication line TL52 is connected to the communication line TL62, and the power line PL53 is connected to the power line PL63 via the switch 53.

In the connected state, the processing unit 54 in the second connector 122 is operated with power that is supplied from the receptacle 5 side via the first connector 121, for example. The processing unit 54 creates verification information, and transmits the created verification information to the first connector 121 via the communication line TL62 and the communication line TL52.

The verification unit 51 in the first connector 121 receives the verification information transmitted from the second connector 122, via the communication line TL62 and the communication line TL52, and performs a verification process for the second connector 122, based on the received verification information. Then, the verification unit 51 outputs result information A1 indicating the verification result to the control unit 52. The verification process performed by the verification unit 51 is identical to the verification process performed by the verification unit 11 shown in FIG. 2.

The control unit 52 receives the result information A1 outputted from the verification unit 51, and controls the switch 53, based on the result information A1.

In more detail, when the result information A1 received from the verification unit 51 indicates that the verification for a mating device connected to the first connector 121 has succeeded, in other words, when the mating device connected to the first connector 121 is the second connector 122, the control unit 52 switches the switch 53 to the ON state. Thus, the power line PL53 and the power line PL63 are electrically connected to each other. Therefore, the electric device 6 can receive power supplied from the receptacle 5 side via the power line PL53 and the power line PL63.

Meanwhile, when the result information A1 received from the verification unit 51 indicates that the verification for the mating device connected to the first connector 121 has failed, in other words, when the mating device connected to the first connector 121 is a device different from the second connector 122, the control unit 52 maintains the switch 53 in the OFF state. Thus, supply of power from the receptacle 5 side to an unintended device can be avoided.

The verification unit 51 in the first connector 121 detects connection/disconnection of the second connector 122 to/from the first connector 121. Upon detecting that the second connector 122 has been disconnected from the first connector 121, the verification unit 51 outputs detection information indicating the detection result to the control unit 52.

Upon receiving, from the verification unit 51, the detection information indicating that the second connector 122 has been disconnected, the control unit 52 switches the switch 53 from the ON state to the OFF state.

The verification unit 51 may be configured to perform the verification process periodically or non-periodically. In this case, the verification unit 51 can detect disconnection of the second connector 122 by checking whether or not a new digital signature S has been received within a predetermined period from the timing at which the previous digital signature S was received. When a new digital signature S has not been received within the predetermined period from the timing at which the previous digital signature S was received, the verification unit 51 outputs result information A1 indicating that the verification has failed, to the control unit 52.

<Operation Flow>

Figure 11:
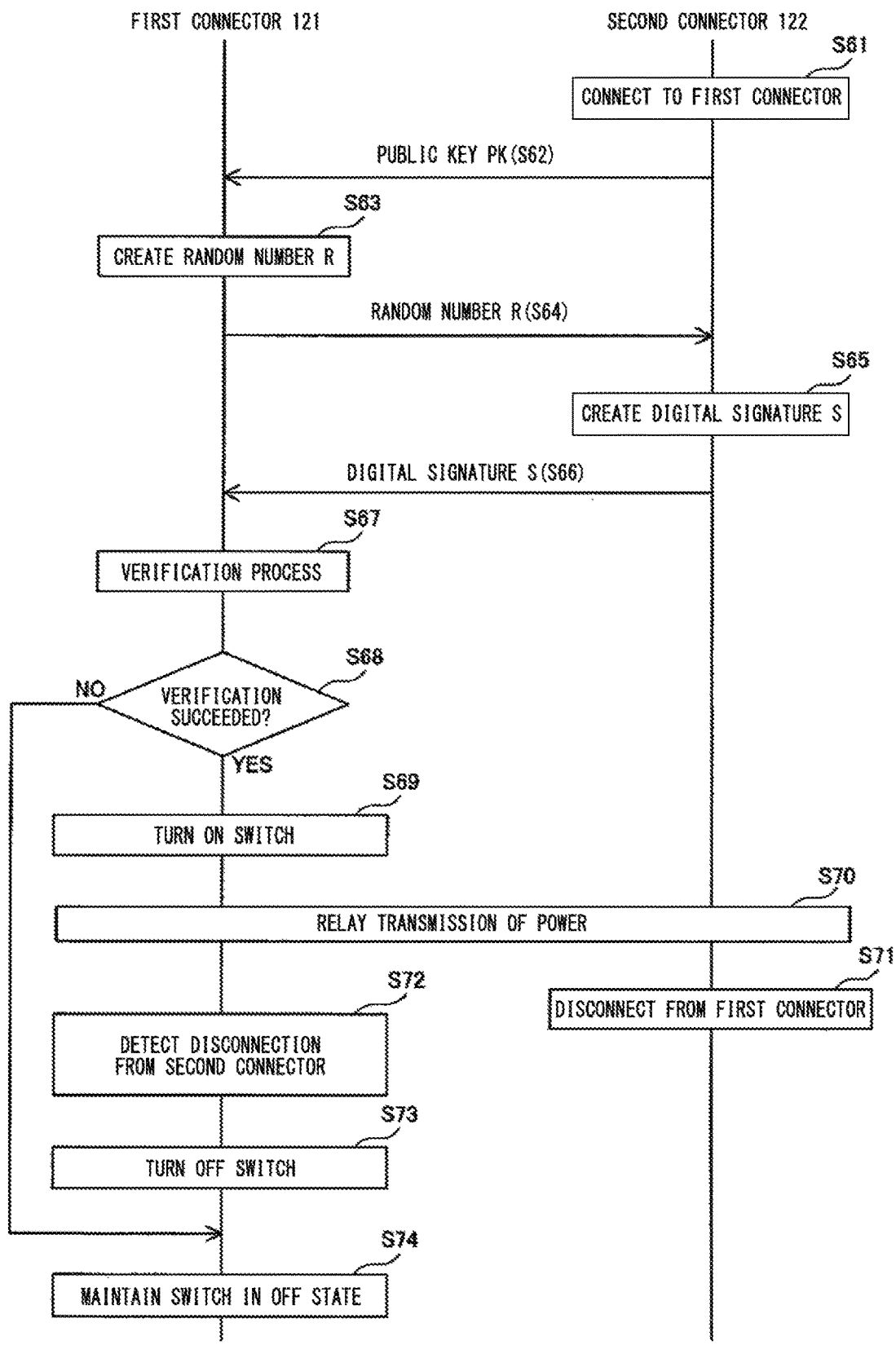
FIG. 11 is a sequence diagram that defines an operation procedure of the connector system according to the fourth embodiment of the present disclosure.

FIG. 11 is a sequence diagram that defines an operation procedure of the connector system according to the fourth embodiment of the present disclosure.

With reference to FIG. 10 and FIG. 11, first, the second connector 122 is connected to the first connector 121, for example (step S61).

Next, the processing unit 54 in the second connector 122 performs an information transmission process of creating a public key PK and a private key SK, and transmitting the created public key PK to the first connector 121 via the communication line TL62 and the communication line TL52 (step S62).

Next, the verification unit 51 in the first connector 121 receives the public key PK from the second connector 122, and creates random numbers R (step S63).

Next, the verification unit 51 transmits the created random numbers R to the second connector 122 via the communication line TL52 and the communication line TL62 (step S64).

Next, the processing unit 54 in the second connector 122 receives the random numbers R from the first connector 121, and creates an encrypted digital signature S by using the created private key SK and the received random numbers R (step S65).

Next, the processing unit 54 performs an information transmission process of transmitting the created digital signature S to the first connector 121 via the communication line TL62 and the communication line TL52 (step S66).

Next, the verification unit 51 in the first connector 121 receives the digital signature S from the second connector 122, and decrypts the digital signature S by using the public key PK. Then, the verification unit 51 performs a verification process for the second connector 122 by using the decrypted digital signature S and the random numbers R, and outputs result information A1 indicating the result of the verification process to the control unit 52 (step S67).

Next, when the result information A1 received from the verification unit 51 indicates that the verification for a mating device connected to the first connector 121 has succeeded ("YES" in step S68), the control unit 52 switches the switch 53 to the ON state (step S69).

Next, the first connector 121 and the second connector 122 relay transmission of power from the receptacle 5 side to the electric device 6 (step S70).

Next, for example, when the second connector 122 is disconnected from the first connector 121 (step S71), the verification unit 51 in the first connector 121 detects the disconnection of the second connector 122, and outputs detection information indicating the detection result to the control unit 52 (step S72).

Next, the control unit 52 receives, from the verification unit 51, detection information indicating the disconnection of the second connector 122, and switches the switch 53 from the ON state to the OFF state (steps S73 and S74).

Meanwhile, when the result information A1 received from the verification unit 11 indicates that the verification for the mating device connected to the first connector 121 has failed ("NO" in step S68), the control unit 52 maintains the switch 53 in the OFF state (step S74).

Disconnection of the second connector 122 from the first connector 121 (step S71) is not necessarily performed after relaying of the transmission of power by the first connector 121 and the second connector 122 (step S70), and may be performed at any timing, from step S61 or thereafter.

If the switch 53 is in the OFF state at the timing when the second connector 122 is disconnected, that is, if the second connector 122 is disconnected before step S69, the switch 53 is maintained in the OFF state. Meanwhile, if the switch 53 is in the ON state at the timing when the second connector 122 is disconnected, that is, if the second connector 122 is disconnected in step S69 or thereafter, the switch 53 is switched from the ON state to the OFF state (step S73).

As described above, in the connector system 204 according to the fourth embodiment of the present disclosure, the first connector 121 includes the power line PL63. The second connector 122 includes the power line PL63. The processing unit 54 in the second connector 122 performs the information transmission process of creating verification information, and transmitting the verification information to the first connector 121. The switch 53 in the first connector 121 selects whether or not to electrically connect the power line PL53 and the power line PL63 to each other, in the state where the first connector 121 and the second connector 122 are connected to each other. The verification unit 51 in the first connector 121 performs the verification process of verifying the second connector 122, based on the verification information received from the second connector 122. Then, the control unit 52 in the first connector 121 controls the switch 53, based on the result of the verification process performed by the verification unit 51.

As described above, the electrical connection between the power line PL53 and the power line PL63 is switched based on the result of the verification process performed by the first connector 121. Therefore, when the power line PL53 and the power line PL63 perform power transmission, power is prevented from being transmitted to an unintended device.

In the connector system 204 according to the fourth embodiment of the present disclosure, electrical connection between devices can be controlled more appropriately.

Since other components and operations thereof are identical to those of the connector system 201 according to the first embodiment of the present disclosure, detailed descriptions thereof are not repeated.

The features of the connector system 201 of the first embodiment, the connector system 202 of the second embodiment, the connector system 203 of the third embodiment, and the connector system 204 of the fourth embodiment according to the present disclosure can be appropriately combined.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A connector system comprising a first connector including a first transmission line, and a second connector including a second transmission line, wherein the second connector includes a processing unit configured to perform an information transmission process of creating information regarding verification, and transmitting the information to the first connector, the first connector includes:

a switch configured to, in a state where the first connector and the second connector are connected to each other, select whether or not to electrically connect the first transmission line and the second transmission line to each other;

a verification unit configured to perform a verification process of verifying the second connector, based on the information received from the second connector; and a control unit configured to control the switch, based on a result of the verification process, the first transmission line and the second transmission line are connected to different devices, and relay a communication signal or power that is transmitted between the devices, and the verification unit performs the verification process using a digital signature which is the information.

[Additional Note 2]

A connector including a first transmission line, comprising:

a switch configured to, in a state where the connector is connected to another connector including a second transmission line, select whether or not to electrically connect the first transmission line and the second transmission line to each other;

a verification unit configured to perform a verification process of verifying a mating device connected to the connector; and a control unit configured to control the switch, based on a result of the verification process, wherein the first transmission line and the second transmission line are connected to different devices, and relay a communication signal or power that is transmitted between the devices, and the verification unit performs the verification process using a digital signature.

[Additional Note 3]

A connector connectable to a mating connector including a first transmission line, comprising:

a processing unit configured to create information regarding verification, and transmit the information to the mating connector; and a second transmission line, the mating connector comprising:

a switch configured to, in a state where the mating connector is connected to another connector, select whether or not to electrically connect the first transmission line and the second transmission line to each other;

a verification unit configured to perform a verification process of verifying the other connector, based on the information; and a control unit configured to control the switch, based on a result of the verification process, wherein the first transmission line and the second transmission line are connected to different devices, and relay a communication signal or power that is transmitted between the devices, and the other connector performs a verification process for the connector by using a digital signature which is the information.

REFERENCE SIGNS LIST 1 wire harness
2 on-vehicle device
3, 4 communication device
5, 15 receptacle
6, 16 electric device
7 plug
11, 31, 36, 51, 71 verification unit
12, 32, 37, 52, 72 control unit
13, 33, 38, 53, 73 switch
14, 34, 35, 54, 74 processing unit
101, 111, 121, 131 first connector (mating connector)
102, 112, 122, 132 second connector
201, 202, 203, 204 connector system

The invention claimed is:

1. A connector system comprising a first connector including a first transmission line, and a second connector including a second transmission line, wherein
the second connector includes a processing unit configured to perform an information transmission process of creating information regarding verification, and transmitting the information to the first connector, and
the first connector includes:
a switch configured to, in a state where the first connector and the second connector are connected to each other, select whether or not to electrically connect the first transmission line and the second transmission line to each other;
a verification unit configured to perform a verification process of verifying the second connector, based on the information received from the second connector; and
a control unit configured to control the switch, based on a result of the verification process.

2. The connector system according to claim 1, wherein the first connector and the second connector respectively include additional transmission lines that are electrically connected to each other without the switch intervening therebetween, in the state where the first connector and the second connector are connected to each other.

3. The connector system according to claim 1, wherein power regarding an operation of the first connector is supplied from the second connector.

4. The connector system according to claim 1, wherein the verification unit starts the verification process when the first connector and the second connector are connected to each other.

5. The connector system according to claim 1, wherein the processing unit starts the information transmission process upon receiving a request for the information from the first connector.

6. The connector system according to claim 1, wherein the verification unit performs the verification process periodically or non-periodically, and after turning on the switch based on the result of the verification process, the control unit determines whether or not to turn off the switch based on a result of a new verification process.

7. The connector system according to claim 1, wherein the switch is in an off state in a state where the first connector and the second connector are not connected to each other,
when the verification unit has not received the information for a predetermined period or more, the verification unit notifies the control unit that the verification has failed, and
when the control unit is notified of the failure of verification from the verification unit, the control unit maintains the switch in the off state.

8. The connector system according to claim 1, wherein the verification unit, in the verification process, receives the information regarding verification from the processing unit through a wire.

9. The connector system according to claim 1, wherein the first connector and the second connector are mounted on a vehicle.

10. A connector including a first transmission line, comprising:
a switch configured to, in a state where the connector and another connector having a second transmission line are connected to each other, select whether or not to electrically connect the first transmission line and the second transmission line to each other;
a verification unit configured to perform a verification process of verifying a mating device connected to the connector; and
a control unit configured to control the switch, based on a result of the verification process.

11. The connector according to claim 10 being mounted on a vehicle.

12. A connector connectable to a mating connector including a first transmission line, comprising:
a processing unit configured to create information regarding verification, and to transmit the information to the mating connector; and
a second transmission line, wherein
the information is used for a verification process of verifying the connector, the verification process being for controlling a switch included in the mating connector, the switch configured to, in a state where the mating connector is connected to the connector, select whether or not to electrically connect the first transmission line and the second transmission line to each other.

13. A connection method adopted in a connector system which is provided with a first connector including a first transmission line and a second connector including a second transmission line,
the first connector further including a switch configured to, in a state where the first connector and the second connector are connected to each other, select whether or not to electrically connect the first transmission line and the second transmission line to each other,
the method comprising:
a step in which the second connector performs an information transmission process of creating information regarding verification, and transmitting the information to the first connector;
a step in which the first connector performs a verification process of verifying the second connector, based on the information received from the second connector; and a step in which the first connector controls the switch, based on a result of the verification process.

\* \* \* \* \*